（12）United States Patent
Aguilar et al.

(10) Patent No.: US 9,789,511 B2
(45) Date of Patent: Oct. 17, 2017

(54) JETTING DEVICES

(71) Applicant: Nordson Corporation, Westlake, OH (US)

(72) Inventors: Stanley C. Aguilar, El Cajon, CA (US); David N. Padgett, Carlsbad, CA (US)

(73) Assignee: Nordson Corporation, Westlake, OH (US)

( * ) Notice: Subject to any disclaimer, the term of this patent is extended or adjusted under 35 U.S.C. 154(b) by 747 days.

(21) Appl. No.: 13/795,581

(22) Filed: Mar. 12, 2013

(65) Prior Publication Data

US 2014/0263738 A1   Sep. 18, 2014

(51) Int. Cl.
B05C 11/10   (2006.01)
B05C 5/02   (2006.01)
(Continued)

(52) U.S. Cl.
CPC .......... B05C 5/0225 (2013.01); B05B 1/304 (2013.01); B05C 11/1034 (2013.01); F16K 31/1221 (2013.01); Y10T 137/0402 (2015.04)

(58) Field of Classification Search
CPC ... B05B 1/304; B05B 1/3046; B05C 11/1002; B05C 11/1034; B05C 5/0225; F16K 31/1221
USPC .................. 239/580, 581.2, 582.1, 583, 584; 251/129.18, 285, 215, 217, 220, 229, 296; 222/282, 287, 309
See application file for complete search history.

(56) References Cited

U.S. PATENT DOCUMENTS 4,096,750 A * 6/1978 Sturm .................. B01L 3/0224
422/925
4,556,193 A * 12/1985 Yoshiga ................. F16K 31/04
251/129.11
(Continued)

FOREIGN PATENT DOCUMENTS

CN   201008812 Y   1/2008
CN   201143481 Y   11/2008
(Continued)

OTHER PUBLICATIONS

European Patent Office, International Search Report and Written Opinion issued in international application No. PCT/ US2014/016419 dated Jun. 23, 2014.
(Continued)

Primary Examiner — Alexander Valvis
(74) Attorney, Agent, or Firm — Baker & Hostetler LLP

(57) ABSTRACT

Jetting devices and methods for dispensing a fluid material from a fluid supply. A jetting device includes a fluid module configured to be coupled with the fluid supply and to dispense the fluid material. The fluid module includes a valve seat and a valve element configured to move relative to the valve seat over a stroke length, and a valve stop configured to position the valve element relative to the valve seat for determining the stroke length. The jetting device further includes a drive module configured to actuate the fluid module and includes a drive pin configured to move the valve element toward the valve seat. The drive pin is configured to be rotated to cause rotation of the valve stop for adjustment of the stroke length. The drive pin may be rotated by a rotation device comprising a motor.

8 Claims, 5 Drawing Sheets

(51) Int. Cl.
   *B05B 1/30*   (2006.01)
   *F16K 31/122*   (2006.01)

(56) References Cited

U.S. PATENT DOCUMENTS

| | | | |
|---|---|---|---|
| 5,022,556 A | | 6/1991 | Dency et al. |
| 5,312,050 A | * | 5/1994 | Schumann .......... F02M 51/0639 239/585.1 |
| 5,598,973 A | | 2/1997 | Weston |
| 5,747,102 A | * | 5/1998 | Smith ..................... B05C 5/001 222/1 |
| 6,622,983 B2 | * | 9/2003 | Hall ...................... B24C 7/0053 251/214 |
| 8,915,261 B2 | * | 12/2014 | Kanomata .............. B01D 15/40 137/486 |
| 2003/0000965 A1 | | 1/2003 | Bach et al. |
| 2005/0001869 A1 | | 1/2005 | Abernathy et al. |
| 2007/0069041 A1 | | 3/2007 | Quinones et al. |
| 2010/0294810 A1 | * | 11/2010 | Ikushima ............ B05C 11/1034 222/309 |
| 2011/0094606 A1 | * | 4/2011 | Kanomata ............... B01D 15/40 137/487.5 |
| 2013/0048759 A1 | | 2/2013 | Aguilar et al. |

FOREIGN PATENT DOCUMENTS

| | | |
|---|---|---|
| DE | 4033990 A1 | 5/1991 |
| EP | 2561932 | 2/2013 |

OTHER PUBLICATIONS

Chinese Application No. 201480014028.9: First Office Action dated Dec. 30, 2016, 11 pages.

\* cited by examiner

JETTING DEVICES

BACKGROUND

The invention relates generally to the application of fluid materials and, in particular, to devices for use in jetting fluid materials.

Jetting devices may require different types of dispensing valves, or dispensing valve components, that are dedicated to different types of dispensing applications in electronic industry applications in which minute amounts of a fluid material are applied onto a substrate. A "jetting device" is a device which ejects, or "jets", a droplet of material from a dispenser nozzle to land on a substrate, and wherein the droplet disengages from the dispenser nozzle before making contact with the substrate. Thus, in a jetting type dispenser, the droplet dispensed is "in-flight" between the dispenser and the substrate, and not in contact with either the dispenser or the substrate, for at least a part of the distance between the dispenser and the substrate. Numerous applications exist for jetting devices that dispense underfill materials, encapsulation materials, surface mount adhesives, solder pastes, conductive adhesives, and solder mask materials, fluxes, and thermal compounds. As the type of application for the jetting device changes, the type of jetting device must also adapt to match the application change.

One type of jetting device includes a valve device having a valve element configured to selectively engage a valve seat. During a jetting operation, the valve element of the jetting device is moved relative to the valve seat by a driving mechanism. Contact between the valve element and the valve seat seals off a discharge passage from a fluid chamber supplied with fluid material under pressure. Thus, to dispense droplets of the fluid material, the valve element is retracted from contact with the valve seat to allow a finite amount of the fluid material to flow through the newly formed gap and into the discharge passage. The valve element is then moved rapidly toward the valve seat to close the gap, which generates pressure that accelerates the finite amount of fluid material through the discharge passage and causes a droplet of the material to be ejected, or jetted, from an outlet of the discharge passage.

Jetting devices are configured for controlled movements above the substrate and the fluid material is jetted to land on an intended application area of a substrate. By rapidly jetting the material "on the fly" (i.e., while the jetting device is in motion), the dispensed droplets may be joined to form a continuous line. Jetting devices may therefore be easily programmed to dispense a desired pattern of fluid material. This versatility has made jetting devices suitable for a wide variety of applications in the electronics industry. For example, underfill material can be applied using a jetting device to dispense fluid material proximate to one or more edges of a chip, with the material then flowing under the chip by capillary action.

In conventional jetting devices, the valve element and the valve seat may tend to wear over time and with usage. As a consequence of this wear, the shape of the valve element and the valve seat are changed, and these shape changes can influence the characteristics of the fluid material being dispensed. For example, the size, shape, and weight of the fluid material dispensed during a jetting operation can vary as the shape of the valve element and the valve seat change. Changes in the size, shape, or weight of the dispensed fluid material are generally disfavored, as such changes disrupt the consistency of products treated with the jetting devices.

Moreover, conventional jetting devices are difficult to clean and maintain because their components are not constructed in a manner that allows simply disassembly and maintenance.

SUMMARY OF THE INVENTION

According to an embodiment of the invention, a jetting device is provided for dispensing a fluid material from a fluid supply. The jetting device includes a fluid module configured to be coupled with the fluid supply and to dispense the fluid material. The fluid module includes a valve seat, a valve element configured to move relative to the valve seat over a stroke length, and a valve stop configured to position the valve element relative to the valve seat for determining the stroke length. The jetting device further includes a drive module configured to actuate the fluid module. The drive module has a drive pin configured to move the valve element toward the valve seat. The drive pin is configured to be rotated to cause rotation of the valve stop for adjustment of the stroke length. The drive pin may be rotated using a rotation device, which may comprise a motor.

According to another embodiment of the invention, a jetting device is provided for dispensing a fluid material from a fluid supply. The jetting device includes a fluid module configured to be coupled with the fluid supply and to dispense the fluid material. The fluid module includes a valve seat and a valve element configured to move relative to the valve seat over a stroke length. The fluid module further includes a valve stop configured to be rotated to adjustably position the valve element relative to the valve seat for determining the stroke length. The jetting device further includes a drive module configured to actuate the fluid module. The drive module has a drive pin configured to extend through an opening in the valve stop and to move the valve element toward the valve seat.

According to yet another embodiment of the invention, a method is provided for adjusting the stroke length of a valve in a fluid module of a jetting device configured to dispense a fluid material. The fluid module includes a module body having a bore and a valve stop positioned in the bore. The method includes rotating the valve stop in the bore to move the valve stop toward or away from the valve.

BRIEF DESCRIPTION OF THE DRAWINGS

The accompanying drawings, which are incorporated in and constitute a part of this specification, illustrate exemplary embodiments of the invention and, together with a general description of embodiments of the invention given above, and the detailed description given below, serve to explain the principles of the embodiments of the invention.

DETAILED DESCRIPTION

Generally, the embodiments of the invention are primarily directed to a dispensing valve in the form of a jetting device. The jetting device includes a fluid module having a valve, and the fluid module provides structure for adjusting the distance between a valve element and a valve seat of the valve. In some embodiments, this adjustment can be performed automatically without removing the fluid module from the jetting device. In other embodiments, the adjustment can be performed manually after the fluid module is removed from the jetting device.

Figure 1:
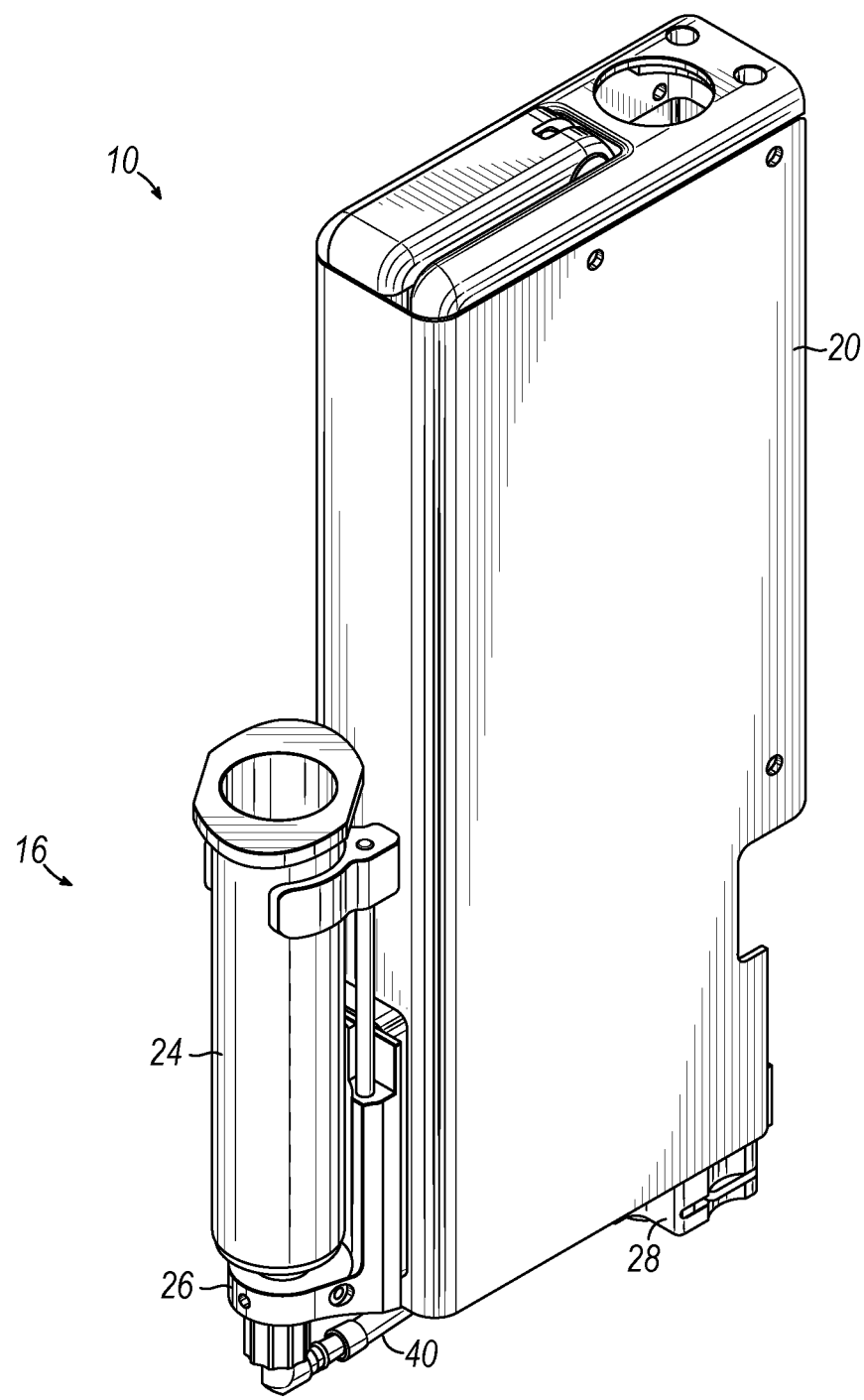
FIG. 1 is a perspective view of a jetting device in accordance with an embodiment of the invention.
Figure 2:
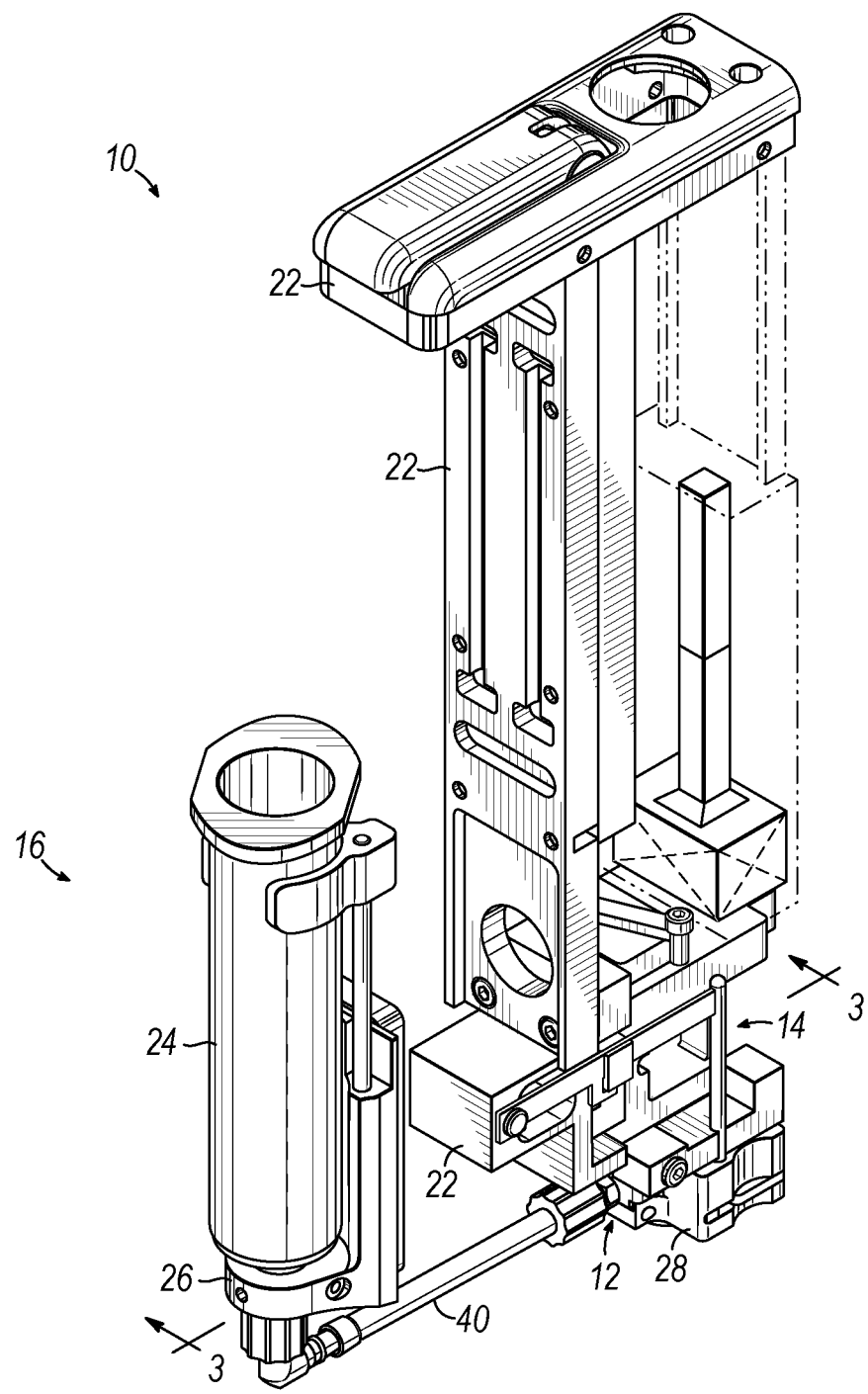
FIG. 2 is a perspective view similar to FIG. 1 in which an outer housing of the jetting device has been removed for purposes of description.
Figure 3:
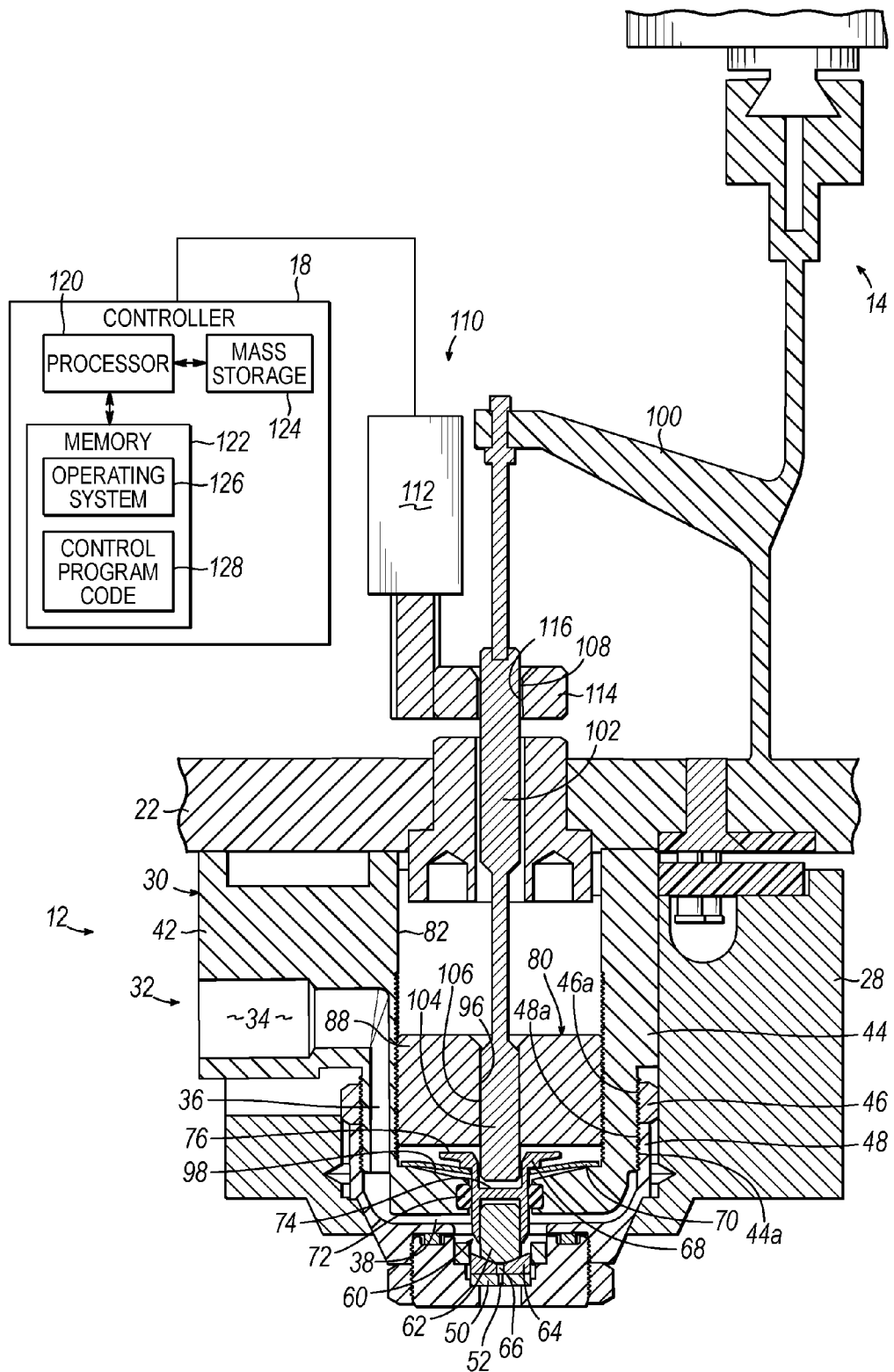
FIG. 3 is a cross-sectional view taken generally along line 3-3 in FIG. 2.
Figure 3A:
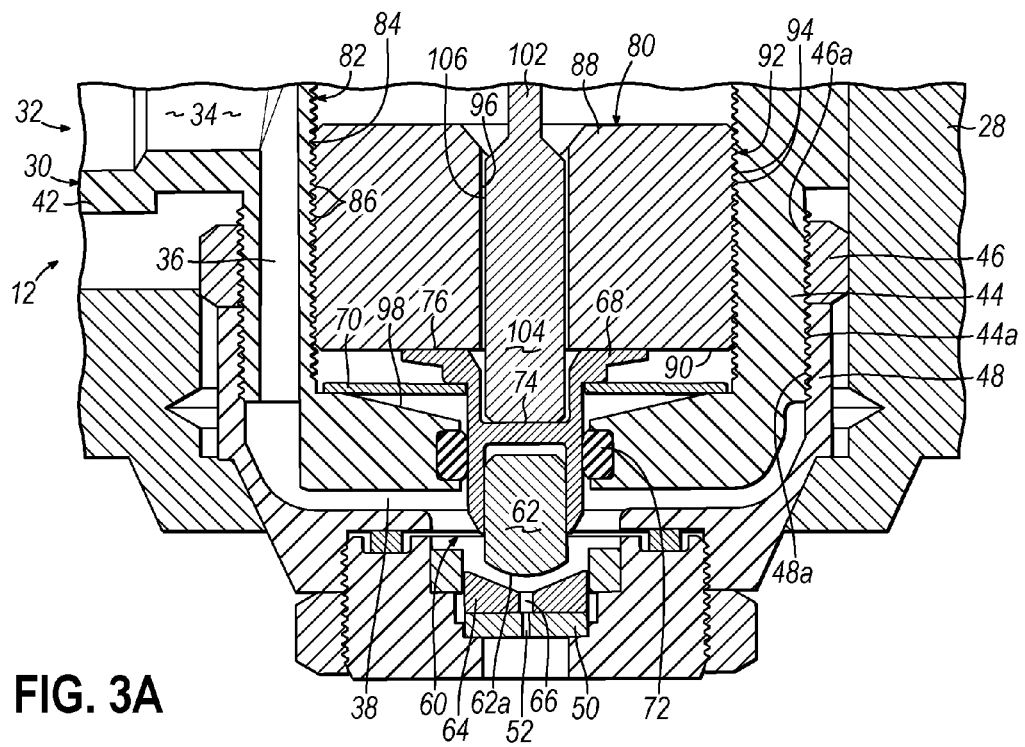
FIG. 3A is an enlarged cross-sectional view showing a valve in an open position.
Figure 3B:
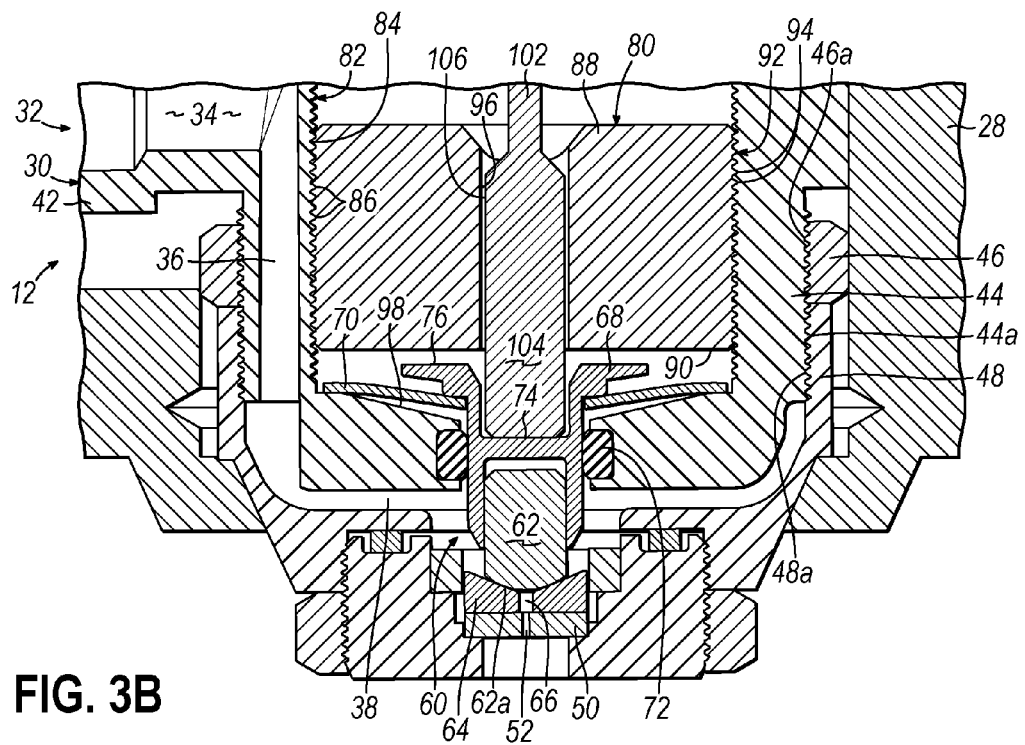
FIG. 3B is an enlarged cross-sectional view like FIG. 3A but showing the valve in a closed position.

With reference to FIGS. 1-3 and in accordance with an embodiment of the invention, a dispensing valve in the representative embodiment of a jetting device 10 is shown. The jetting device 10 generally includes a cartridge or fluid module 12, a drive module 14, a fluid supply 16, and a controller 18. The fluid module 12, drive module 14, and controller 18 are enclosed within a housing 20, and the fluid supply 16 is positioned generally outside the housing 20. The fluid module 12, drive module 14, and controller 18 are supported by internal members 22 of the jetting device 10. The fluid module 12 is configured to receive fluid material from the fluid supply 16 and to dispense the fluid material. The drive module 14 is configured to interact with the fluid module 12 to dispense fluid material therefrom. Particularly, the drive module 14 is configured to actuate a valve of the fluid module. The controller 18 provides control features for the jetting device 10, such as for the drive module 14 and for other components, as will be discussed below.

The jetting device 10 is supplied with pressurized fluid material from the fluid supply 16 which includes a syringe 24. The syringe 24 is supported by a syringe holder 26 mounted as an appendage to the housing 20. Generally, the fluid material in the syringe 24 may be any material or substance known by a person having ordinary skill in the art to be amenable to jetting and may include, but is not limited to, solder flux, solder paste, adhesives, solder mask, thermal compounds, oil, encapsulants, potting compounds, inks and silicones. The syringe 24 operates as a fluid supply 16 for the jetting device 10.

In the embodiment shown, the fluid module 12 resides in a heater device 28 of the jetting device 10 for maintaining an operational temperature of the fluid material. Advantageously, the fluid module 12 can be removed from the heater device 28.

The jetting device 10 may be installed in a machine or system (not shown) for intermittently jetting amounts of a fluid material onto a substrate and may be moved relative to the substrate as the amounts of fluid material are jetted. The jetting device 10 may be operated such that a succession of jetted amounts of the fluid material are deposited on the substrate as a line of spaced-apart material dots. The substrate targeted by the jetting device 10 may support various surface mounted electronic components, which necessitates non-contact jetting of the minute amounts of fluid material rapidly and with accurate placement to deposit fluid material at targeted locations on the substrate. As detailed hereinbelow, the fluid module 12 is accessible for easy removal from the jetting device 10.

As best seen in FIG. 3, the fluid module 12 includes a module body 30. The module body 30 provides a fluid connection interface 32 having a fluid inlet 34 for connecting with the fluid supply 16. The module body 30 also provides an internal fluid passageway 36 and a fluid chamber 38. The passageway 36 couples the fluid inlet 34 with the fluid chamber 38. A fluid conduit 40 (FIG. 2) extends between the fluid supply 16 and the fluid module 12, in particular from the syringe 24 to the fluid connection interface 32. The conduit 40 allows fluid material to be supplied under pressure from the syringe 24 to the fluid inlet 34. In this embodiment, the fluid conduit 40 is typically a length of tubing directly connecting the outlet of the syringe 24 with the fluid connection interface 32 without any intervening structure. In one embodiment, the fluid connection interface 32 includes a threaded fitting, for example.

The syringe 24 may be configured to use pressurized air to direct the fluid material to flow toward the fluid inlet 34 and ultimately to the fluid chamber 38 of the fluid module 12. The pressure of the pressurized air, which is supplied to the head space above the fluid material contained in the syringe 24, may range from five (5) psig to sixty (60) psig. Typically, a wiper or plunger (not shown) is disposed between the air pressure in the head space and the fluid material level inside the syringe 24, and a sealing cap (not shown) is secured to the open end of the syringe barrel for supplying the air pressure.

In the embodiment shown, the module body 30 comprises several portions, including a first portion 42 having a neck 44, and second and third portions 46, 48. The second and third portions 46, 48 are coupled with the neck 44 of the first portion, as shown. In particular, the second and third portions 46, 48 include threaded portions 46a, 48a that are threaded onto a threaded portion 44a of the neck 44. It will be appreciated that the position of the second and third portions 46, 48 can be adjusted with respect to the first portion 42, such as to adjust the spacing between components supported or provided by those portions 42, 44, 46. Alternatively, the module body 30, including the portions 42, 46, 48 could be made as a single unified piece.

The fluid module 12 also includes a nozzle 50 which is supported by the third portion 48. The nozzle 50 is configured for dispensing fluid material from the fluid module 12, and includes a nozzle outlet 52.

The fluid module 12 further includes a valve 60 for regulating the flow of fluid material through the fluid module 12. The valve 60 is disposed between the fluid inlet 34 and the nozzle outlet 52. In particular, the valve 60 includes a valve element 62 and a valve seat 64. The valve seat 64 includes an opening 66 in fluid communication with both the fluid chamber 38 and the nozzle outlet 52. The valve seat 64 is supported by the third portion 48. The valve 60 can be in open and closed positions to allow and prevent, respectively, the flow of fluid material out of the nozzle outlet 52. The fluid chamber 38 communicates with the nozzle outlet 52.

The valve 60 further includes a moveable element 68 which carries the valve element 62. A biasing element 70 peripherally contacts the moveable element 68 and is configured to apply an axial spring force to the moveable element 68. In particular, the biasing element 70 is connected with the first portion 42 of the module body 30 and with the moveable element 68. For example, the biasing element 70 can include a diaphragm spring. The moveable element 68 is moveable with respect to the module body 30. A sealing device 72, such as an O-ring, is supported by the module body 30 and generally surrounds the moveable element 68, as shown. The moveable element 68 includes a strike surface 74 that is configured to be engaged by a drive pin for moving the valve element 62, as will be discussed further below. The moveable element 68 also includes a contact surface that is configured to engage a valve stop for limiting the movement of the valve element 62, as will also be discussed further below.

The valve element 62 is carried by, or attached, to the moveable element 68 and is located inside the fluid chamber 38 at a location between the strike surface 74 of the moveable element 68 and the valve seat 64. Alternatively, the valve element 62 and moveable element 68, including the strike surface 74 and contact surface 76, may be made as a single unified piece. The biasing element 70 exerts a biasing force on the moveable element 68 in the upward direction, such that the valve element 62 is moved away from the valve seat 64 by the biasing element 70.

Because the second and third portions 46, 48 of the module body 30 are moveable, as discussed above, the relative position of the valve seat 64 and the valve element 62 can be adjusted. For example, the third portion 48 can be moved downwardly on the neck 44 of the first portion 42, such as to move the valve seat 64 downwardly and increase the distance between the valve element 62 and the valve seat 64. The second portion 46 can be moved into position adjacent the third portion 48 to prevent subsequent upward movement of the third portion 48. Thereby, the second portion 46 serves the function of a lock nut for constraining the movement of the third portion 48. In addition, the third portion 48 can be removed from the first portion 44, thereby facilitating maintenance of the components of the fluid module 12.

The fluid module 12 further includes a valve stop 80 configured for limiting the extent of movement of the valve 60. In particular, the valve stop 80 interacts with the moveable element 68 to limit the range of upward movement of the valve element 62. Generally the amount the valve element 62 moves with respect to the valve seat 64 is referred to as the stroke length of the valve 60. By limiting the range of upward movement of the valve element 62, the valve stop 80 can influence the stroke length.

The valve stop 80 is positioned in a bore 82 of the module body 30. In particular, the bore 82 is provided in the first portion 42 and includes an engagement portion 84 configured for engaging the valve stop 80. As shown, the engagement portion 84 includes threads 86.

The valve stop 80 includes a body 88 that includes a stop surface 90 near a lower region thereof. The stop surface 90 is configured to engage the contact surface 76 of the moveable element 68. The body 88 further includes an engagement portion 92 configured for engaging with the engagement portion 84 of the bore 82. As shown, the engagement portion 92 includes threads 94 for threading engagement with the threads 86 of the engagement portion 84 of the bore 82. The body 88 further includes a generally centrally-disposed bore or opening 96 configured to receive a drive pin, as will be discussed further below. Moreover, the opening 96 is configured to be shape-matched with the drive pin, as will also be discussed further below. The valve stop 80, including the stop surface 90, is spaced from a base region 98 of the bore 82.

As shown, the valve stop 80 has a generally cylindrical overall shape, but other shapes are possible. For example, the body 88 could have one or more flanges that define one or more engagement portions or the stop surface. In addition, while the valve stop 80 has a generally continuous circular outer circumference, the body 88 could have a plurality of lobes or extensions that define one or more engagement portions or the stop surface.

The drive module 14 is configured to operate, or actuate, the valve 60. In particular, the drive module includes a drive mechanism (not shown) that is configured to cause a drive transmission link 100 to move. The drive transmission link 100, in turn, imparts movement to the moveable element 68 of the valve 60. In the embodiment shown, the drive transmission link 100 includes a drive pin 102. It will be appreciated that any suitable drive mechanism may be used. Movement imparted to the moveable element 68 causes the valve element 62 to move into contact with the valve seat 64.

The drive pin 102 projects into the bore 82 in the module body 30 and through the opening 96 of the valve stop 80. A tip 104 of the drive pin is located adjacent to the strike surface 74 of the moveable element 68 and on an opposite side of the strike surface 74 from the valve element 62.

The drive pin 102 is indirectly coupled with the valve element 62 and operates as a component of the drive module 14. In particular, the drive pin 102 and the valve element 62 jointly cooperate to dispense fluid material by jetting fluid material from the jetting device 10. When the drive pin 102 is moved to cause the valve element 62 to contact the valve seat 64, the tip 104 of the drive pin 102 operates much like the operation of a hammer by striking the strike surface 74 of the moveable element 68 to transfer its force and momentum to the strike surface 74. This in turn causes the valve element 62 to rapidly strike the valve seat 64 and jet a droplet of material from the jetting device 10. Specifically, the valve element 62, which is not directly connected with the drive pin 102, is configured to be moved into contact with the valve seat 64 by an impulse imparted by the tip 104 of the actuated drive pin 102. Again, the drive pin 102 is caused to move by the driving mechanism of the drive module 14 and the drive transmission link 100.

When contact between the drive pin 102 and the strike surface 74 is removed, the axial spring force applied by the biasing element 70 acts to move the moveable element 68 (and the valve element 62) away from the valve seat 64 in a direction aligned with the longitudinal axis of the drive pin 102. The moveable element 68 is directed upwardly until its contact surface 76 encounters the stop surface 90 provided by the valve stop 80. The contact surface 76 cannot proceed past the stop surface 90, and thereby the valve stop 80 limits the range of upward movement of the moveable element 68, and thereby the valve element 62.

Each reciprocating cycle of the drive pin 102 and valve element 62 jets a droplet of the fluid material. The cycle is repeated to jet sequential droplets of fluid material as required.

A lower surface 62a of the valve element 62 faces the valve seat 64. The lower surface 62a and the valve seat 64 may have corresponding shapes or curvatures. As a result, a fluid seal is temporarily formed when the valve element 62 has a contacting relationship with the valve seat 64 during jetting. Establishment of the fluid seal during motion of the valve element 62 helps halt the flow of fluid material from the fluid chamber 38 past the valve seat 64.

Advantageously, the valve stop 80 is moveable in the module body 30 so as to change the position of the stop surface 90. Again, the interaction between the stop surface 90 of the valve stop 80 and the contact surface 76 of the moveable element 68 influences the range of motion of the valve element 62. In particular, rotation of the valve stop 80 with respect to the module body 30 causes an engagement between the threads 86 of the bore 82 with the threads 94 of the valve stop 80. This allows the valve stop 80 to be moved upwardly or downwardly in the bore 82.

Advantageously, the drive pin 102 can be used to rotate the valve stop 80. In particular, the drive pin 102 includes a first engagement portion 106 proximate the tip 104 that is shape-matched with at least a portion of the opening 96 of the valve stop 80. In the embodiment shown, the first engagement portion 106 and the opening 96 have generally corresponding hexagonal shapes. This type of shape-matching allows relative longitudinal movement between the drive pin 102 and the valve stop 80, but prevents relative rotational movement. In other words, the drive pin 102 is free to move up and down in the opening 96 without causing movement of the valve stop 80. However, because of the shape-matching between the first engagement portion 106 and the opening 96, rotation of the drive pin 102 causes corresponding rotation of the valve stop 80. More particularly, the distance between the valve stop 80/stop surface 90 and the base region 98 can be adjusted.

The drive pin 102 further includes a second engagement portion 108 that is configured to be engaged and rotated by a rotation device 110 of the jetting device 10. The rotation device 110 is an electronic device that includes a drive motor 112 operatively coupled with a chuck 114. The chuck 114 is configured to rotate and to engage the drive pin 102, and in particular, the second engagement portion 108. The drive motor 112 can be used to cause rotation of the chuck 114. The chuck 114 includes a socket 116 that is shape-matched to the second engagement portion 108. In the embodiment shown, the socket 116 and the second engagement portion 108 have generally corresponding hexagonal shapes, like the first engagement portion 106 and the opening 96 discussed above. This type of shape-matching allows relative longitudinal axial movement between the socket 116 of the rotation device 110 and the drive pin 102, but prevents relative rotational movement. In other words, the drive pin 102 is free to move up and down in the socket 116. However, because of the shape-matching between the second engagement portion 108 and the socket 116, rotation of the chuck 114 causes corresponding rotation of the drive pin 102. The rotation device 110 tends to prevent the drive pin 102 from rotating unless the drive motor 112 is actuated to rotate the chuck 114.

Thereby, actuation of the rotation device 110 induces rotation in the drive pin 102, which induces rotation in the valve stop 80, which adjusts the position of the stop surface 90. Advantageously, rotation of the drive pin 102 by the rotation device 110 can be performed while the drive pin 102 is also being moved up and down axially by the drive module 14. Thereby, the position of the valve stop 80 can be adjusted while the jetting device 10 is being used to dispense fluid material. This allows adjustments to the position of the stop surface 90 to be made while the valve element 62 is actively being used for jetting fluid material. Additionally or alternatively, rotation of the drive pin 102 by the rotation device 110 can be performed while the drive pin is not being moved up and down.

Adjustment of the position of the valve stop 80 may be made on any appropriate basis. For example, it may be appropriate or desired to adjust the valve stop 80 in the case of wear of the components of the valve 60. If the valve element 62 or the valve seat 64 changes shape as a result of use, adjustment of the valve stop 80 may be necessary to adjust the size, weight, or shape of the fluid material being dispensed from the jetting device 10. For example, moving the valve stop 80 upwardly away from the base region 98 will increase the stroke length of the valve 60, thereby increasing the amount of fluid material that is dispensed during a jetting operation. Or, the valve stop 80 can be moved downwardly toward the base region 98 to decrease the stroke length of the valve 60, thereby decreasing the amount of fluid material that is dispensed during a jetting operation. Advantageously, the position of the valve stop 80 can be adjusted, as necessary, in order to maintain a consistent size, weight, or shape of fluid material that is dispensed.

The amount of adjustment of the position of the valve stop 80 may be determined based on a number of factors. For example, it may be determined that the valve stop 80 moves a certain distance up or down in the bore 82 per rotations of the valve stop 80. Thereby, the valve stop may be rotated by any whole or fractional number of rotations in order to achieve a desired movement distance.

While the generally hexagonal components provided the shape-matching features discussed above, other configurations that allow for relative longitudinal movement while preventing relative rotational movement are also possible. For example, and without limitation, square components would be suitable, as would components with corresponding complementary keys and keyways.

The rotation device 110 may be coupled with the controller 18 to control the operation of the rotation device 110. The controller 18 may comprise any electrical control apparatus configured to control one or more variables based upon one or more inputs. The controller 18 can be implemented using at least one processor 120 selected from microprocessors, micro-controllers, microcomputers, digital signal processors, central processing units, field programmable gate arrays, programmable logic devices, state machines, logic circuits, analog circuits, digital circuits, and/or any other devices that manipulate signals (analog and/or digital) based on operational instructions that are stored in a memory 122. The memory 122 may be a single memory device or a plurality of memory devices including but not limited to random access memory (RAM), volatile memory, non-volatile memory, static random access memory (SRAM), dynamic random access memory (DRAM), flash memory, cache memory, and/or any other device capable of storing digital information. The controller 18 has a mass storage device 124 that may include one or more hard disk drives, floppy or other removable disk drives, direct access storage devices (DASD), optical drives (e.g., a CD drive, a DVD drive, etc.), and/or tape drives, among others.

The processor 120 of the controller 18 operates under the control of an operating system 126, and executes or otherwise relies upon computer program code embodied in various computer software applications, components, programs, objects, modules, data structures, etc. The program code 128 residing in memory 122 and stored in the mass storage device 124 also includes control algorithms that, when executing on the processor 120, control the operation of the rotation device 110 and, in particular, provide control signals to the rotation device 110 for operating the drive motor 112 to rotate the chuck 114. The computer program code typically comprises one or more instructions that are resident at various times in memory 122, and that, when read and executed by the processor 120, causes the controller 18 to perform the steps necessary to execute steps or elements embodying the various embodiments and aspects of the invention.

Various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

The controller 18 may include a human machine interface (HMI) that is operatively connected to the processor 120 in a conventional manner. The HMI (not shown) may include output devices, such as alphanumeric displays, a touch screen, and other visual indicators, and input devices and controls, such as an alphanumeric keyboard, a pointing device, keypads, pushbuttons, control knobs, etc., capable of accepting commands or input from an operator and communicating the entered input to the processor 120, and of displaying information to the operator.

The controller 18 may optionally be used to control the operation of devices supporting the operation of a manufacturing tool that embodies the jetting device 10 of the embodiments of the invention. In addition and as mentioned above, the drive module 14 may be coupled with the controller 18 to control the operation of the drive module 14 and movement of the drive transmission link 100 and the drive pin 102. Further still, the controller 18 can be used in conjunction with devices that measure the size, shape, or weight of fluid material dispensed from the jetting device 10 in order to control the adjustment of the valve stop 80. For example, an optical sensor or weight measuring sensor can be used to determine the size, shape, or weight of fluid material dispensed from the jetting device 10 and can be associated with the controller 18. Based on information relating the size, shape, or weight of fluid material, the controller 18 could provide control signals to the rotation device 110 for operating the drive motor 112 to rotate the chuck 114 in order to adjust the position of the valve stop 80 in order to adjust the size, shape, or weight characteristics of the fluid material dispensed.

Figure 4:
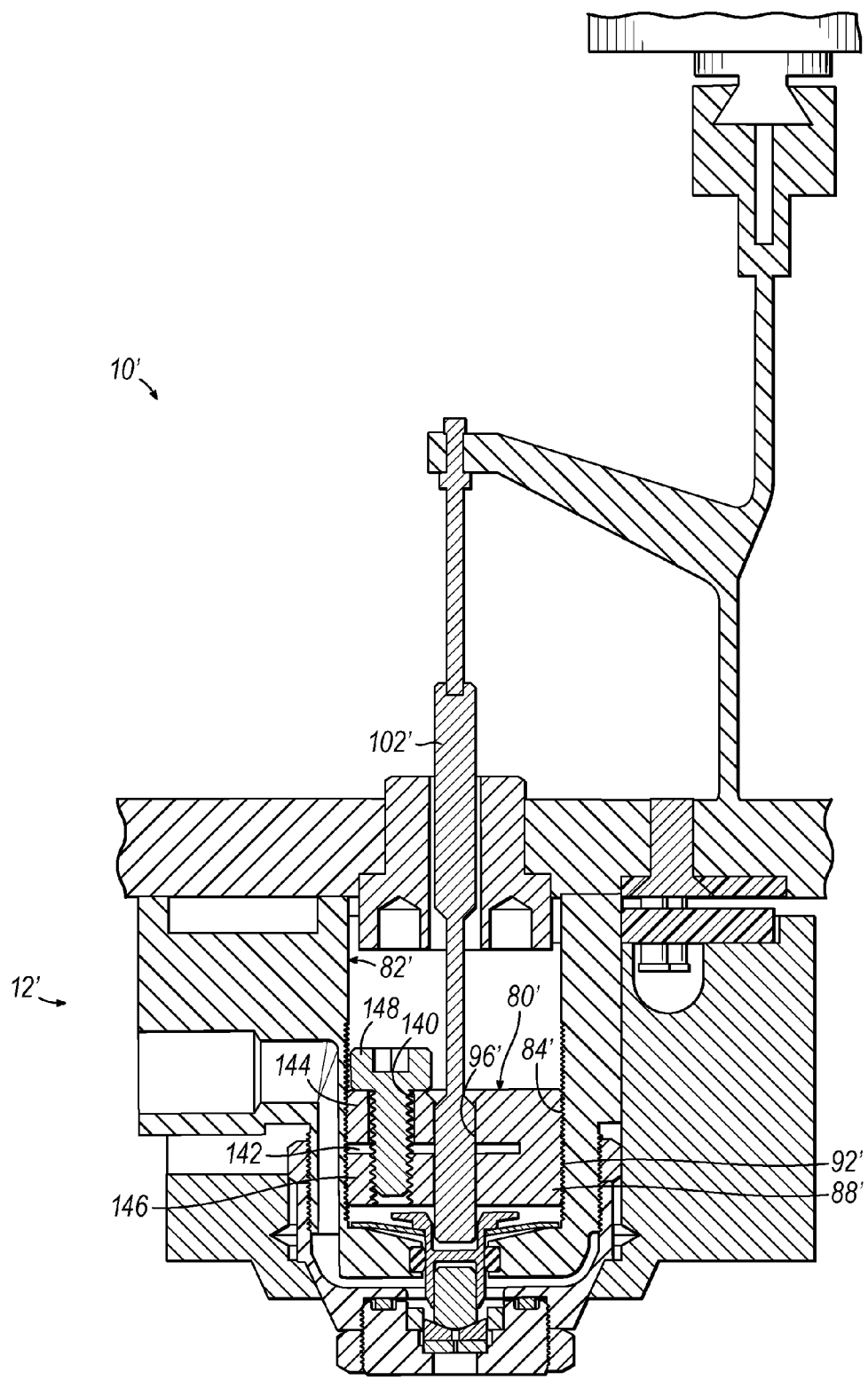
FIG. 4 is a cross-sectional view like FIG. 3 but showing an alternative embodiment of a jetting device.

Referring next to FIG. 4, features of a jetting device 10' are shown and include a fluid module 12' having a valve stop 80' constructed according to a further embodiment of the invention. The jetting device 10' does not include a rotation device for rotating the valve stop 80' when the fluid module 12' is situated in the jetting device 10'. Rather, the fluid module 12' must be removed from the jetting device 10' in order for the valve stop 80' to be adjusted. It will be appreciated that the features of the jetting device 10' are substantially similar to the features of the jetting device 10 discussed above and shown in FIGS. 1-3B, except as further described.

The valve stop 80' includes features for locking or preventing the rotational movement thereof in the bore 82'. In particular, the body 88' of the valve stop 80' includes a locking bore 140 and a generally-transverse slot 142 positioned between body portions 144, 146. A threaded fastener 148, such as a socket head screw, is received in the locking bore 140, and tightening of the locking bolt 148 causes the body portions 144, 146 to deflect toward one another, thereby tightening the grip of the engagement portion 92' of the valve stop 80' with the engagement portion 84' of the bore 82'. This tends to prevent the valve stop 80' from being rotated in the bore 82'.

When the threaded fastener 148 is loosened in or removed from the locking bore 140, the grip between the engagement portions 92', 84' is relaxed, and the valve stop 80' is permitted to rotate in the bore 82'.

Since the fluid module 12' does not include a rotation device, it is not necessary for the drive pin 102' to include engagement portions that are shape-matched with the opening 96' of the valve stop 80'. Moreover, because the drive pin 102 described above generally prevents the valve stop 80 from rotating unless the rotation device 110 is operated, it is not necessary for the valve stop 80 to include the features shown in FIG. 4 for locking the rotational movement of the valve stop 80.

References herein to terms such as "vertical", "horizontal", "upper", "lower", "raise", "lower", etc. are made by way of example, and not by way of limitation, to establish a frame of reference. It is understood by persons of ordinary skill in the art that various other frames of reference may be equivalently employed for purposes of describing the embodiments of the invention.

It will be understood that when an element is described as being "attached", "connected", or "coupled" to or with another element, it can be directly connected or coupled to the other element or, instead, one or more intervening elements may be present. In contrast, when an element is described as being "directly attached", "directly connected", or "directly coupled" to another element, there are no intervening elements present. When an element is described as being "indirectly attached", "indirectly connected", or "indirectly coupled" to another element, there is at least one intervening element present.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the open-ended term "comprising."

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A jetting device for jetting droplets of fluid material onto a substrate supporting electronic components, the jetting device comprising:

a fluid module configured to be coupled with a fluid supply and to jet the fluid material, the fluid module including a valve seat, a moveable element having an upper surface and a contact surface, a valve element carried by the moveable element and configured to move relative to the valve seat over a stroke length, and a valve stop configured to adjustably define the stroke length, and a drive module configured to actuate the fluid module and including a drive pin configured to, upon movement of the drive pin towards the valve seat to engage the upper surface of the moveable element, move the valve element into contact with the valve seat to jet a droplet of the fluid material from the jetting device onto the substrate, the drive pin configured to be rotated to cause rotation of the valve stop for adjustment of the stroke length, wherein the contact surface is configured to engage the valve stop, and the stroke length is defined between a position where the valve element contacts the valve seat and a position where the contact surface contacts the valve stop.

2. The jetting device of claim 1, wherein the valve stop includes an opening, and the drive pin extends through the opening and includes a first engagement portion shape-matched with a portion of the opening.

3. The jetting device of claim 2, wherein the first engagement portion of the drive pin and the portion of the opening each have a plurality of sides arranged with complementary shapes.

4. The jetting device of claim 2, further comprising:
a rotation device including a chuck having a socket,
wherein the drive pin includes a second engagement portion shape-matched with the socket, and the chuck is configured to receive the second engagement portion and to be rotated to cause rotation of the drive pin.

5. The jetting device of claim 4, wherein the second engagement portion of the drive pin and the socket each have a plurality of sides arranged with complementary shapes.

6. The jetting device of claim 4, wherein the rotation device comprises a motor.

7. The jetting device of claim 1, wherein the fluid module includes a module body having a first portion providing a fluid inlet configured to receive the fluid material from the fluid supply and a second portion supporting the valve seat, the second portion threadably coupled with the first portion.

8. The jetting device of claim 1, wherein the drive pin is configured for free reciprocal movement within the valve stop.

* * * * *